(12) United States Patent
Terai et al.

(10) Patent No.: US 7,984,189 B2
(45) Date of Patent: Jul. 19, 2011

(54) RECORDING MEDIUM STORING SLIP DATA PROCESSING PROGRAM, METHOD OF PROCESSING SLIP DATA, AND SLIP DATA PROCESSING DEVICE

(75) Inventors: Yoshiyuki Terai, Kawasaki (JP);
Tomohiko Kunimitsu, Kawasaki (JP);
Isamu Kawamura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 765 days.

(21) Appl. No.: 11/477,030

(22) Filed: Jun. 28, 2006

(65) Prior Publication Data
US 2007/0233713 A1    Oct. 4, 2007

(30) Foreign Application Priority Data
Mar. 30, 2006    (JP) ................................. 2006-096020

(51) Int. Cl.
*G06F 15/16*    (2006.01)
(52) U.S. Cl. ...................................................... 709/246
(58) Field of Classification Search ................... 709/246
See application file for complete search history.

(56) References Cited

U.S. PATENT DOCUMENTS

| | | | | |
|---|---|---|---|---|
| 5,504,676 A | * | 4/1996 | Domen et al. .................. 705/30 |
| 5,948,070 A | * | 9/1999 | Fujita ............................. 709/243 |
| 6,279,025 B1 | * | 8/2001 | Yamamoto et al. ............ 718/100 |
| 2002/0013142 A1 | * | 1/2002 | Koto .............................. 455/410 |
| 2005/0235133 A1 | * | 10/2005 | Terai et al. ......................... 712/1 |

FOREIGN PATENT DOCUMENTS

| | | |
|---|---|---|
| JP | 2002-298072 | 10/2002 |
| JP | 2005-267476 | 9/2005 |
| JP | 2005-301644 | 10/2005 |

OTHER PUBLICATIONS

Notice of Rejection Grounds issued in corresponding Japanese Application No. 2006-096020 on Dec. 28, 2010.

* cited by examiner

*Primary Examiner* — Larry Donaghue
(74) *Attorney, Agent, or Firm* — Greer, Burns & Crain, Ltd.

(57) ABSTRACT

In a slip data processing program according to the present invention, in a first process step of a task executing a rule corresponding to an acquisition destination (action), data to be processed is collected into one. Also, when termination state information of one of the respective steps included in the task indicates a normal termination, information about the data processed in the step is deleted from a process execution state recording unit recording a process execution state of the step, and information about the data processed in the step is added to a process execution state recording unit of a step next to the step.

14 Claims, 15 Drawing Sheets

| EXECUTION ORDER OF PROCESSES INCLUDED IN RULE |
|---|
| COLLECTION→DIVISION→CONVERSION (EXECUTION/INEXECUTION)→TRANSMISSION |
| COLLECTION→CONVERSION (EXECUTION/INEXECUTION)→TRANSMISSION |
| COLLECTION→DISTRIBUTION→CONVERSION (EXECUTION/INEXECUTION)→DIVISION→TRANSMISSION |
| COLLECTION→DISTRIBUTION→CONVERSION (EXECUTION/INEXECUTION)→TRANSMISSION |
| ⋮ |

F I G. 2

| ACTION NAME | INPUT QUEUE NAME | MAX MULTIPLEXING DEGREE | MAX ACQUISITION NUMBER | TIME WIDTH |
|---|---|---|---|---|
| ACT001 | QUEUE001 | 5 | 200 | 10 |
| ACT002 | QUEUE002 | 3 | 200 | 5 |
| : | : | : | : | : |

FIG. 3A

| ACTION NAME | INPUT QUEUE NAME | OUTPUT QUEUE NAME | RULE NAME |
|---|---|---|---|
| ACT001 | QUEUE001 | QUEUE002<br>QUEUE003 | RULE001 |
| ACT002 | QUEUE004 | QUEUE005 | RULE002 |
| : | : | : | : |

FIG. 3B

[ COLLECTION ]

| ACTION NAME | ARRIVAL TIME | EXECUTION STATE | POINTER TO DATA | POINTER TO INFORMATION ABOUT DATA |
|---|---|---|---|---|
| ACT001 | 20050920101301002361 | executing | | |
| ACT001 | 20050920101302100326 | wait | | |
| ACT002 | 20050920101302369012 | executing | | |
| ACT001 | 20050920101302598021 | wait | | |
| : | : | : | : | : |

$23_1$

[ DISTRIBUTION ]

| ACT001 | 20050920101301524626 | executing | | |
|---|---|---|---|---|
| : | : | : | : | : |

$23_2$

[ CONVERSION ]

| ACT002 | 20050920101301001120 | executing | | |
|---|---|---|---|---|
| ACT001 | 20050920101301551248 | executing | | |
| : | : | : | : | : |

$23_3$

[ TRANSMISSION ]

| ACT002 | 20050920101300000100 | executing | | |
|---|---|---|---|---|
| ACT002 | 20050920101301004555 | wait | | |
| : | : | : | : | : |

[AFTER INPUT PROCESS]
　IN INPUT PROCESS, SLIP IS EXTRACTED FROM INPUT QUEUE
　　　　AND BATCH FORMAT IS GENERATED

| innode1 | | ADDRESS |
|---|---|---|
| A00001 | — | |
| B00011 | G0000100 | |
| B00012 | G0000100 | HEADER SECTION |
| B00013 | G0000100 | |
| A00002 | — | |
| : | : | |
| SLIP 1 | LINE FEED | |
| SLIP 2 | LINE FEED | |
| SLIP 3 | LINE FEED | DATA SECTION |
| SLIP 4 | LINE FEED | |
| SLIP 5 | LINE FEED | |
| : | : | |

Columns: SLIP UNIQUE NUMBER, GROUP NUMBER

F I G. 1 0 A

[AFTER DISTRIBUTION PROCESS]
EXAMPLE IN WHICH DATA OF TWO ADDRESSES ARE DISTRIBUTED

ADDRESS (SET OUTPUT DESTINATION)

| outnode1 | |
|---|---|
| B00011 | G0000100 |
| B00012 | G0000100 |
| B00013 | G0000100 |
| SLIP 2 | LINE FEED |
| SLIP 3 | LINE FEED |
| SLIP 4 | LINE FEED |
| : | : |
| outnode2 | |
| A00001 | — |
| A00002 | — |
| : | : |
| SLIP 1 | LINE FEED |
| SLIP 5 | LINE FEED |
| : | : |

ADDRESS (SET OUTPUT DESTINATION)

FIG. 10B

[AFTER CONVERSION PROCESS]
VALUE, POSITION, LENGTH, AND CHARACTER CODE OF BUSINESS DATA
CAN BE CHANGED BY CONVERSION

| outnode1 | |
|---|---|
| B00011 | G0000100 |
| B00012 | G0000100 |
| B00013 | G0000100 |
| SLIP 2' | LINE FEED |
| SLIP 3' | LINE FEED |
| SLIP 4' | LINE FEED |
| : | : |
| outnode2 | |
| A00001 | — |
| A00002 | — |
| : | : |
| SLIP 1' | LINE FEED |
| SLIP 5' | LINE FEED |
| : | : |

FIG. 10C

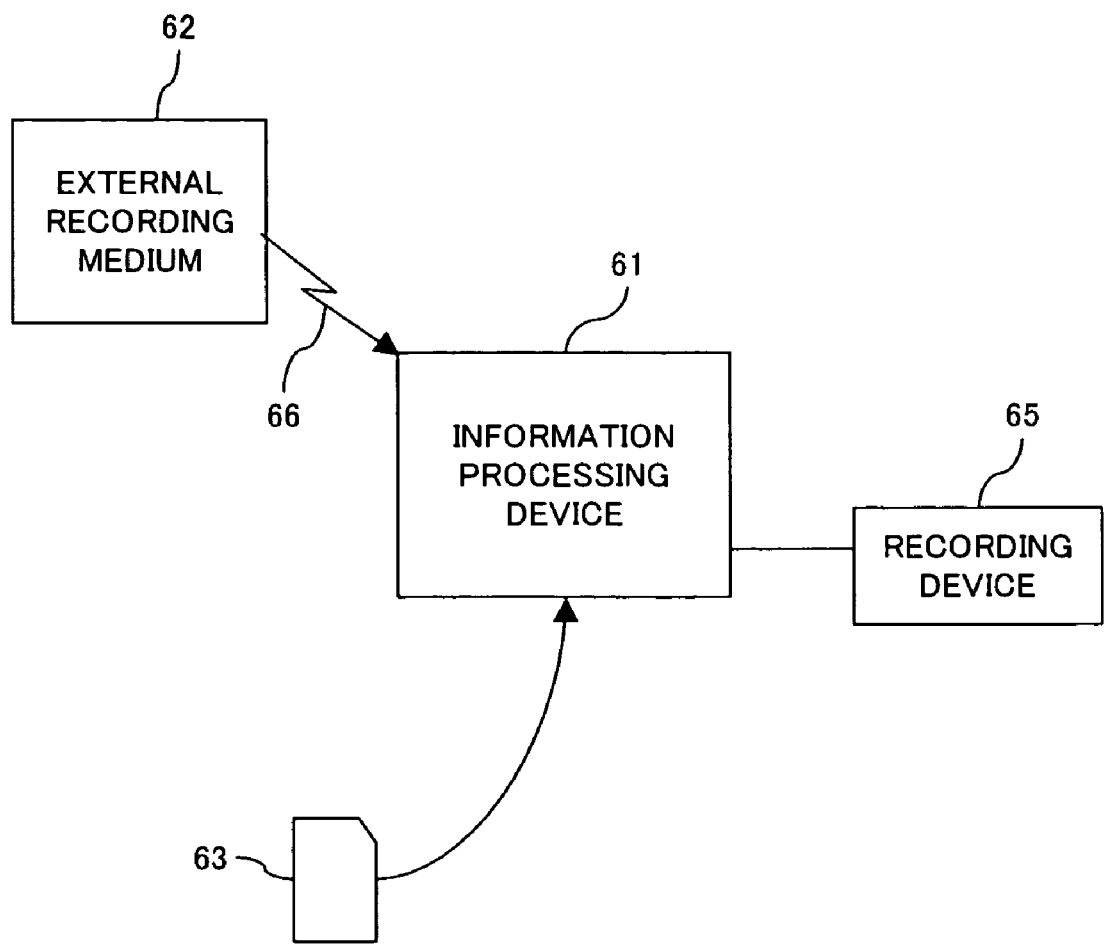
F I G. 1 2

RECORDING MEDIUM STORING SLIP DATA PROCESSING PROGRAM, METHOD OF PROCESSING SLIP DATA, AND SLIP DATA PROCESSING DEVICE

BACKGROUND OF THE INVENTION

1. Field of the Invention

The present invention relates to a recording medium storing a slip data processing program, a method of processing slip data, and a slip data processing device.

2. Description of the Related Art

Slip data is sometimes transmitted and received between systems. In some situations, for example, a system transmitting slip data and a system receiving the slip data use different formats of the slip, or a transmitting system has to transmit the slip data to a plurality of receiving systems.

In the examples listed above, a device for conducting processes required for the slip data is usually provided between the transmitting system and the receiving systems according to requirements regarding the slip data.

Frequently, it is required that the order of slips be held between systems. In some situations, preventing a redundant transmission or data deletion of a slip, and a data security in consideration of an operation are also needed.

Patent document 1 by the inventors of the present application discloses a technique where data is generated by collecting a plurality of pieces of slip data while the slip data are assigned a unique number and a management number. The collected data is exchanged between a plurality of processes executed on the slip data. In the respective processes, the collected data is divided into pieces of single slip data in order to be processed.

However, for example, real-time characteristics in a field such as EAI (Enterprise Application Integration) have been needed more strictly in recent years, and a further accelerated process for slip data has been desired.

Patent Document 1

Japanese Laid-open Patent Application No. 2005-301644 "Method, program, and device for multi processing slip"

SUMMARY OF THE INVENTION

An object of the present invention is to provide a recording medium storing a slip data processing program, a method of processing the slip data, and a slip data processing device, by which processes that need to be executed on slip data can be executed at high speed.

A recording medium according to a first aspect of the present invention stores a slip processing program causing a computer to execute processes required for slip data, which is acquired from an acquisition source and transmitted to a transmission destination, wherein the program causes the computer to generate a task for executing a rule corresponding to the acquisition source based on a slip data acquisition source/execution process step recording unit that makes the acquisition source of the slip data correspond to a rule as a plurality of processes to be executed on the slip data from the acquisition source. The program also causes the computer to execute a step of acquiring at least one piece of slip data from the acquisition source of the slip data and of collecting the pieces of slip data into one piece of data, at a time of execution of the task; a step of converting the collected data and determining a destination based on the content of the collected data, a step of transmitting the converted data to the determined destination; a step of setting termination state information of a process of each of the steps of the collection, the conversion/destination determination, and the transmission at a prescribed position on a recording unit. The program also causes the computer to execute a step in which when one of the steps of setting the termination state information is terminated and termination state information of the terminated step indicates a normal termination, information about data processed in the terminated step is deleted from a process execution state recording unit recording a process execution state of the terminated step, and in which the information about the data processed in the terminated step is added to a process execution state recording unit of a step next to the terminated step.

In the above task executing the rule corresponding to the acquisition source, when termination state information of one of the (collection, conversion/destination determination, and transmission) included in the task indicates a normal termination, the information about the data processed in the step is deleted from the process execution state recording unit recording the process execution state of the step. The information about the data processed in the step is added to a process execution state recording unit of the next step. Thus, it is possible to manage the executing states of process steps in one task. Accordingly, as an example, it is possible to sequentially execute the process steps in the task and to accelerate speed of processing of the slip data.

Also, in the first process step of the task, pieces of data to be processed are collected into one. Accordingly, the subsequent process only needs to be called once to execute the process in the subsequent process step. Therefore, it is possible to accelerate the speed of processing compared to when there are a plurality of pieces of data to be processed and the subsequent processes have to be called for each piece of data.

Further, when it is not necessary to secure the order of data to be processed between the acquisition sources (for example, when slip data from a plurality of acquisition sources are processed), it is possible to execute the tasks corresponding to the acquisition sources asynchronously (in parallel). Accordingly it is possible to accelerate the speed of the slip data processing.

In the above first aspect, a configuration can be employed where the plurality of process execution state recording units are queues; and data corresponding to information about the oldest data is executed in the process step only when an execution state of the information about the oldest data stored in the queue is a waiting state.

By the above configuration, in each process in a task corresponding to one acquisition source, the process avoids processing two pieces of data simultaneously. Accordingly, it is possible to deliver to the transmitting system the slip data acquired from one acquisition source while securing the order stored in the acquisition source.

A method of processing slip data in which a computer executes processes required for slip data, which is acquired from an acquisition source and transmitted to a transmission destination, according to a second aspect of the present invention includes: a step of generating a task for executing a rule corresponding to the acquisition source based on a slip data acquisition source/execution process step recording unit that makes the acquisition source of the slip data correspond to a rule as a plurality of processes to be executed on slip data from the acquisition source. The method also includes a step of acquiring at least one piece of slip data from the acquisition source of the slip data, and of collecting the pieces of slip data into one piece of data at a time of execution of the task; a step of converting the collected data and of determining destination based on a content of the collected data; a step of transmitting the converted data to the determined destination; and a step of setting termination state information of a process of each of the steps of the collection, the conversion/destination determination, and the transmission at a prescribed position on a recording unit; The method further includes a step in which, when one of the steps of setting the termination state information is terminated and termination state information of the terminated step indicates a normal termination, information about data processed in the terminated step is deleted from a process execution state recording unit recording a process execution state of the terminated step, and in which the information about the data processed in the terminated step is added to a process execution state recording unit of a step next to the terminated step.

A slip data processing device executing processes required for slip data, which is acquired from an acquisition source and transmitted to a transmission destination, according to a third aspect of the present invention includes: a process execution unit for generating and executing a task of executing a rule corresponding to the acquisition source based on a slip data acquisition source/execution process step recording unit that makes the acquisition source of the slip data correspond to a rule as a plurality of processes to be executed on the slip data from the acquisition source, wherein the process execution unit executes a step of acquiring at least one piece of slip data from the acquisition source of the slip data and of collecting the pieces of slip data into one piece of data, at a time of execution of the task, a step of converting the collected data and determining a destination based on a content of the collected data. The process execution unit also executes a step of transmitting the converted data to the determined destination; and a step of setting termination state information of a process of each of the steps of the collection, the conversion/destination determination, and the transmission at a prescribed position on a recording means, wherein the slip data processing device further includes a plurality of process execution state recording units for recording process execution states of the respective steps setting the termination state information, and wherein when one of the steps of setting the termination state information is terminated and termination state information of the terminated step indicates a normal termination, information about data processed in the terminated step is deleted from a process execution state recording unit of the terminated step and the information about the data processed in the terminated step is added to a process execution state recording unit of a step next to the terminated step.

In the present invention, in the first step of a task, pieces of data to be processed are collected into one. Accordingly, the subsequent process needs to be called only once to execute the process in the subsequent process step. Therefore, it is possible to accelerate the speed of processing, compared to the case in which there are a plurality of pieces of data to be processed and a subsequent process has to be called for each piece of data.

According to the present invention, it also is possible to manage the execution states of process steps in one task. Accordingly, as an example, it is possible to sequentially execute the process steps and to accelerate the speed of the slip data processing.

Further, according to the present invention, when it is not necessary to secure the order of data to be processed between the acquisition sources (for example, when slip data from a plurality of acquisition sources are processed), it is possible to execute tasks corresponding to the acquisition sources asynchronously (in parallel). Accordingly it is possible to accelerate the speed of the slip data processing.

BRIEF DESCRIPTION OF THE DRAWINGS

FIG. 2 shows an example of a plurality of processes (applied rules) to be executed corresponding to an action by a process determination unit of FIG. 1;

FIG. 3A shows a data configuration (1) of the definition information recording unit of FIG. 1;

FIG. 3B shows another data configuration (2) of the definition information recording unit of FIG. 1;

FIG. 4 shows the process execution state recording unit of FIG. 1 in more detail;

FIG. 10A shows a data configuration of data output as a result of a collection process by a task including the collection process, a distribution process, a conversion process, and a transmission process;

FIG. 10B shows a data configuration of data output as a result of the distribution process by a task including the collection process, the distribution process, the conversion process, and the transmission process;

FIG. 10C shows a data configuration of data output as a result of the conversion process by a task including the collection process, the distribution process, the conversion process, and the transmission process;

FIG. 12 shows an example of a recording medium.

DESCRIPTION OF THE PREFERRED EMBODIMENT

Figure 1:
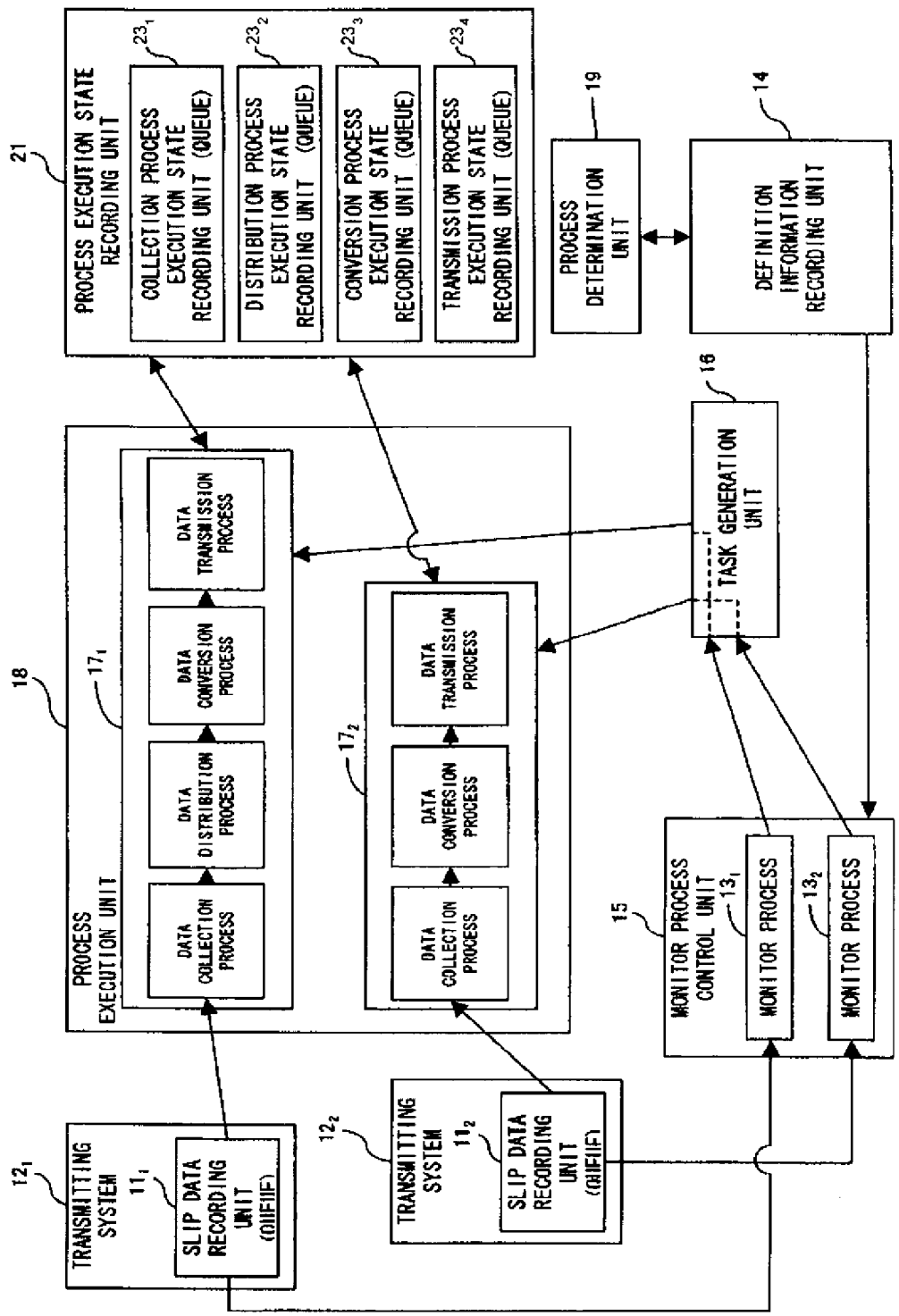
FIG. 1 shows a configuration of a slip process system according to an embodiment of the present invention.

Hereinbelow, the embodiments of the present invention will be explained in detail by referring to the drawings.

In the explanations below, "slip data" is data transmitted and received between systems. Slip data includes any kind of data including data such as issue of order, reception of order, sales in a company and the like, and also includes data of drawings and the like. The slip data can be a single slip, i.e., can be one piece of data, and also can be in a collected state, i.e., one piece of data made by collecting a plurality of pieces of single slip data into one.

For example, slip data recording units $11_1$ and $11_2$ of FIG. 1 (which will be explained later) generally store, as slip data, single slip data and collected data, which were output from corresponding systems. A process execution unit 18 of FIG. 1 executes a (further) collection process on the slip data (single slip data or collected data) acquired from the slip data recording units $11_1$ and $11_2$ in the first step of an applied rule.

FIG. 1 shows a configuration of a slip process system according to an embodiment of the present invention.

As shown in FIG. 1, a slip process system includes transmitting systems $12_1$ and $12_2$ respectively, including the slip data recording units (slip data storage queues) $11_1$ and $11_2$ which can store a plurality of slip data, a definition information recording unit 14 for recording definition information (such as an action as discrimination information for correspondence between an acquisition source (slip data recording unit of transmitting system) of the slip data and a transmission destination (slip data recording unit) to which the slip data acquired from the acquisition source is transmitted after the process, and a rule as a plurality of processes to be executed on the slip data from the acquisition source, which is determined for the action via a process determination unit 19 (which will be explained later)). The slip process system further includes a monitor process control unit 15 for generating as many monitor processes for monitoring the slip data recording units as the slip data recording units to be monitored, based on the definition information recording unit 14 (in the process shown in FIG. 1, the monitor processes 13$_1$ and 13$_2$ monitor the slip data recording units 11$_1$ and 11$_2$, respectively) and for monitoring the storage status of the slip data in the slip data recording units to be monitored via the generated monitor processes.

A process determination unit 19, included in the slip process system is a user interface for proposing one or more rules, each of which is a plurality of processes that can be executed on the slip data from the acquisition source for the actions corresponding to the slip data recording unit to be monitored (acquisition source of slip data), and for determining one rule (i.e., plurality of processes) to be executed from among the above one or more rules using an instruction made by a user, based on the definition information recording unit 14. The slip process system also has a task generation unit 16 for generating a task (in FIG. 1, a task 17$_1$ is the task to be executed on the slip data acquired from a slip data recording unit 11$_1$, and a task 17$_2$ is the task to be executed on the slip data acquired from a slip data recording unit 11$_2$.) to execute the process determined for the slip data based on information regarding one or more pieces of slip data notified and acquired from a monitor process of the monitor process control unit 15 and based on the definition information recording unit 14 when the process on the slip data of an action starts (i.e., when the slip data is acquired for the first time). The task generation unit 16 also notifies the corresponding process in the generated task of the information regarding at least one piece of slip data notified and acquired from the monitor process of the monitor process control unit 15 when the slip data is acquired for the first time and later. The slip process system also has a process execution unit 18 to execute the task generated by the task generation unit 16, and to transmit the slip data of the process result of the task to a slip data recording unit (not shown) of receiving system(s) (not shown).

The slip data recording units 11$_1$ and 11$_2$ are queues which output a plurality of pieces of slip data in accordance with the order of storage in a FIFO (First-In First-Out) manner.

Many of the processes are typical processes that constitute the tasks generated in correspondence with the action. Representative patterns are prepared for the order of the processes.

FIG. 2 shows an example of the plurality of processes (i.e., the applied rule) to be executed corresponding to the action determined by the process determination unit 16 of FIG. 1. In other words, FIG. 2 shows an example of the plurality of processes (i.e., the applied rule or task) to be executed by the process determination unit 16 on the slip data acquired from the slip data recording unit of the transmitting system corresponding to the action.

For purposes of discussion of FIG. 2, "Collection" is defined as collecting at least one piece of slip data acquired from the slip data recording unit of the transmitting system into one piece of data. Each piece of slip data acquired can be single slip data, or can be data made by collecting a plurality of pieces of single slip data. Also, "Division" is to divide the collected data into pieces of single slip data.

"Conversion" is defined as converting data formats of the transmitting system so that the transmitting system uses the same format as the receiving system when the transmitting system and the receiving system use different formats of data.

"Distribution" is defined as gathering single slip data for each transmission destination when there are a plurality of transmission destinations of the slip data (including the case in which there are different destinations for respective pieces of single slip data included in the slip data). Alternatively, "Distribution" means to copy and generate as many pieces of data as there are transmission destinations data when the data is broadcasted to a plurality of transmission destinations designated.

"Transmission" is defined as transmitting the slip data processed to a "Designated transmission destination". As described above, the "Designated transmission destination" is any one of the transmission destinations designated in the action which is the discrimination information regarding the link between one slip data recording unit of the transmitting system and one or more slip data recording unit (s) of the receiving system(s).

The above "Designated transmission destination" information is set for the first time in the data of the process result of the "Distribution" process or the "Conversion" process when the process is executed by the process execution unit 18. The above "Designated transmission destination" information is set when, for example, the transmission destination is determined by referring to a company name included in the slip data in the distribution process.

The processes of the above "Collection", "Division", "Conversion", "Distribution", and "Transmission" are common in all rules. Each of the processes of "Collection", "Division", "Conversion", "Distribution", and "Transmission" recognizes a rule to which it belongs based on an argument given.

For example, in FIG. 1, the data collection process, the data distribution process, the data conversion process, and the data transmission process are executed on the slip data acquired from the slip data recording unit 11$_1$. In regard to the data collection process, the data conversion process, and the data transmission process from among the processes above, either the task 17$_1$ or the task 17$_2$ can be used. The task process designated by the process execution unit 18 executes the data collection process, the data conversion process, and the data transmission process.

FIG. 3A shows a data configuration of the definition information recording unit 14 of FIG. 1.

As shown in FIG. 3A, the definition information recording unit 14 is comprised of an action name, an input queue name, a max multiplexing degree, a max acquisition number, and a time width.

The "Action name" is discrimination information for the link between one input queue (i.e., one slip data recording unit of transmitting system, as shown in FIG. 1) and at least one output queue (slip data recording unit of the receiving system) as described above.

The "Input queue name" is discrimination information (ID or number) of the input queue corresponding to the action. In the "Max multiplexing degree", the number of steps included in the applied rule (task generated on the process execution unit 18) is set.

For example, when a process step A in the rule corresponding to an action terminates in regards to the slip data "Data 1" of the action, then for the slip data "Data1", a process step B, which is the next process step in the rule, is executed, and then for the slip data "Data 2" which follows the slip data "Data1", the process step A is executed. Thinking in this way, for each process step included in the rule corresponding to an action, it is possible to parallely process a plurality of pieces of a block acquired from the input queue of the action. The above "max-multiplexing degree" is the value indicating the maximum number of the processes that can be parallely performed at one time in the rule (task). The value is usually the same as the number of the process steps.

The "Max acquisition number" is the upper limit value of the number of pieces of slip data acquired from the input queue (the slip data recording unit of the transmitting system). This value may be changed when the acquired slip data has a group property.

"Time width" is the value indicating the time before the restarting of the monitoring of the input queue, when not so many pieces of slip data are assumed to be stored in the input queue.

FIG. 3B shows another data configuration of the definition information recording unit 14 of FIG. 1.

FIG. 3B shows a correspondence between actions and rules. FIG. 3B shows, for example, that discrimination information named action (ACT001) is assigned to the link between the input queue (QUEUE 001) and the output queues (QUEUE 002 and QUEUE 003), and that a user caused this action and the rule (RULE 001) to correspond to each other via a user interface (task generation unit 16 of FIG. 1).

In the action (ACT001) of FIG. 3B, there are two queues (QUEUE 002 and QUEUE 003) for receiving data. Accordingly, for example, a list of rules including the "Distribution" process among the rules shown in FIG. 2 is shown to the user through the process determination unit 16, and one rule from the list is selected by the user.

Although it is not shown in FIG. 3B, rules set in the item called rule name are linked with a plurality of processes included in the rules and with information indicating the order of execution of the processes.

Now FIG. 1 will be further described.

If processes have the same name, the process execution state recording unit 21 in FIG. 1 stores the execution state of the processes in process execution state recording units (a collection process execution state recording unit $23_1$, a distribution process execution state recording unit $23_2$, a conversion process execution state recording unit $23_3$, a transmission process execution state recording unit $23_4$) of each of the processes, regardless of the tasks the processes belong to. In other words, the process execution state recording unit 21 stores the states of all the processes in at least one task executed by the process execution unit 18.

FIG. 4 shows the process execution state recording unit 21 of FIG. 1 in more detail.

As shown in FIG. 4, each of the process execution state recording units includes an action name, arrival time, execution state, pointer to data, and pointer to information about the data. Each row shown in FIG. 4 contains information regarding data being processed or to be processed in the respective processes.

In the field of "Execution state", one of two states of "Executing (running)" and "Wait" is set. The "Pointer to data" field contains the top address of process result data in an immediately preceding process.

Specifically, when the value of "Execution state" is "Executing", the process in the current process step on the data whose top address is set in "Pointer to data" is executed. When the value of "Execution state" is "Wait", the process in the current process step on the data, whose top address is set in "Pointer to data", is not executed yet (waiting for execution).

For example, the collection process, the conversion process, and the transmission process are common to the two actions (ACT001 and ACT002). Accordingly, in the execution state recording units (execution state storage queues) of the collection process, the conversion process, and the transmission process, there is data of the action ACT001 and the action ACT002. However, the distribution process is only for the action ACT001. In the execution state recording unit (execution state storage queue) of the distribution process, there is only the data of action ACT001.

The "Arrival time" field indicates the time at which the row (information about data) is written in the process execution state recording unit of the corresponding process. Also, the "Pointer to information about data" is the pointer provided between the respective rows in the order of arrival time. Through this pointer, the process execution state recording units corresponding to the respective processes can constitute queues.

Figure 5:
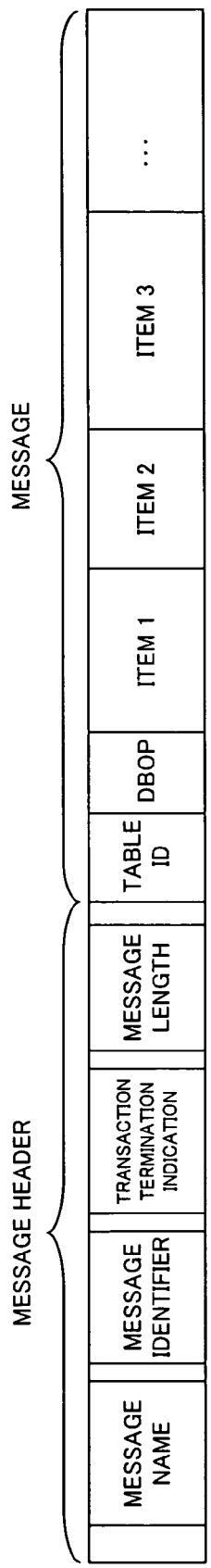
FIG. 5 shows a data configuration of the slip data stored in the slip data recording unit of a transmitting system.

FIG. 5 shows a data configuration of the slip data stored in the slip data recording unit of the transmitting system.

As shown in FIG. 5, in the slip data recording unit of the transmitting system, the slip data is comprised of a message header and a message.

A message identifier in the message header is an identifier (e.g., a number) that is uniquely assigned to the slip data. The identifier is written in a corresponding section of the slip data header by a queue management unit (not shown in FIG. 1) for managing the slip data recording unit (input queue) of the transmitting system.

A transaction termination indication in the message header is flag information for specifying if the slip data has a group property, and for indicating whether there is subsequent slip data belonging to the same group when the slip data has the group property. Specifically, the transaction termination indication can have the three values below.

=value at the time of initialization: the slip data does not have a group property =0: the slip data has a group property, and there is subsequent slip data belonging to the same group =1: the slip data has a group property, and the group ends with this piece of slip data.

Figure 6:
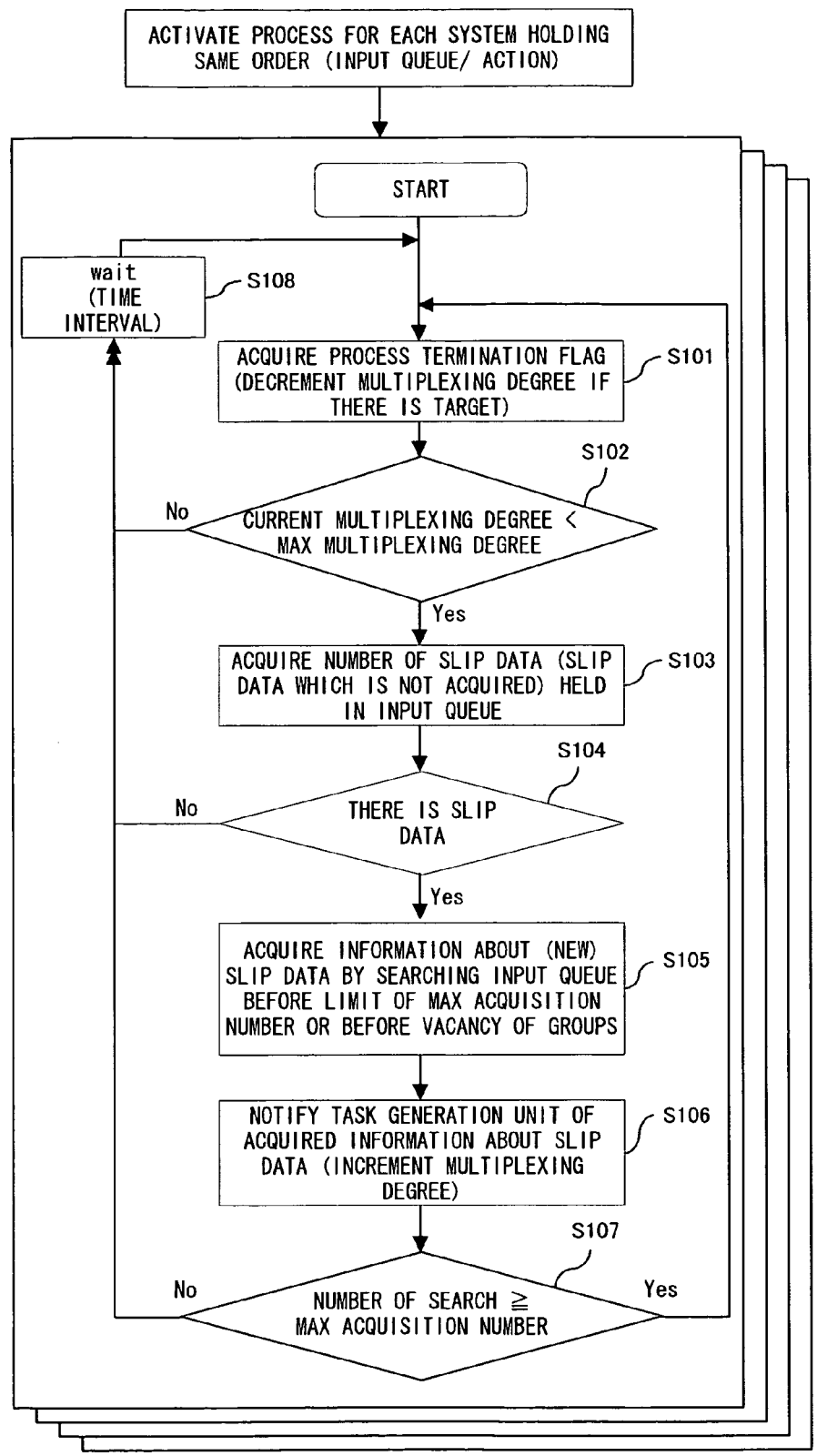
FIG. 6 is a flowchart of a monitor process executed by the monitor process control unit of FIG. 1.

FIG. 6 is a flowchart of the monitor process executed by the monitor process control unit 15 of FIG. 1. The monitor process control unit 15 activates the monitor process for each action. The processes of this flowchart are executed by the monitor process activated for each action.

In FIG. 6, first in step S101, the monitor process checks if the last process (i.e., transmission process) has been completed for precedent data in the same action by referring to the flag information located at a prescribed position in a memory. When a flag indicating that the transmission process has been completed for the precedent data is set at the position in the memory, the monitor process decrements, by one, the multiplexing degree indicating the number of processes currently executed sequentially from among a plurality of processes decided to be executed.

In the subsequent step S102, it is determined if the current multiplexing degree is smaller than the max multiplexing degree.

When it is determined in step S102 that the current multiplexing degree is equal to or greater than the max multiplexing degree, the process returns to step S101 after an idle state which lasts for a prescribed time period in the step S108.

When it is determined in step S102 that the current multiplexing degree is smaller than the max multiplexing degree, the number of pieces of slip data (the slip data which has not been acquired) held in a slip data recording unit 11 of the transmitting system 12 is obtained in step S103.

Then, in step S104, it is determined if the obtained number of pieces of the slip data is equal to or greater than one.

When it is determined that the obtained number is zero (i.e., it is determined that there is no new slip data in the slip data recording unit 11) in step S104, the process returns to step S101 after the idle state which lasts for a prescribed time period in the step S108.

When it is determined in step S104 that the obtained number is equal to or greater than one, information about new slip data held in the slip data recording unit 11 is, in step S105, acquired within the limit of the max acquisition number. However, if a group property is given to slip data and the number of pieces of the slip data of the group exceeds the max acquisition number, information about as many pieces of new slip data as pieces of slip data belonging to the group is acquired (if the number of slip data belonging to the group is the same as the max acquisition number, the same number of pieces of data as the max acquisition number are acquired.

Then, the task generation unit 16 is notified of the information about the new slip data acquired, and the above multiplexing degree is incremented by one in step S106.

In step S107, it is determined if the number of pieces of new slip data acquired in step S105 is equal to or greater than the max acquisition number.

When it is determined in step S107 that the number of pieces of new slip data acquired in step S105 is smaller than the max acquisition number, the process returns to step S101 after the idle state which lasts for a prescribed time period in the step S108.

When it is determined in step S107 that the number of pieces of new slip data acquired in step S105 is equal to or greater than the max acquisition number, the process immediately returns to step S101, but not through step S108. This is because it is determined that the slip data recording unit 11 may still store slip data waiting to be processed since pieces of data equal to or more than the max acquisition number were acquired in step S105.

In step S106, the task generation unit 16, which has been notified of the information about the new slip data acquired, executes the processes below.

1: When the acquired information about the new slip data is the one at the time of the start of the target action, a task for executing the rule corresponding to the action is generated based on the information about the new slip data and on the definition information recording unit 14, and the first process (collection process) in the generated task is notified of the information about the new slip data. The collection process acquires the new slip data included in the notified information from the slip data recording unit of the transmitting system.

2: When the acquired information about the new slip data is not the one at the time of the start of the target action, the task generation unit 16 notifies the fist process (collection process) in the corresponding task of the notified information about the new slip data.

Figure 7:
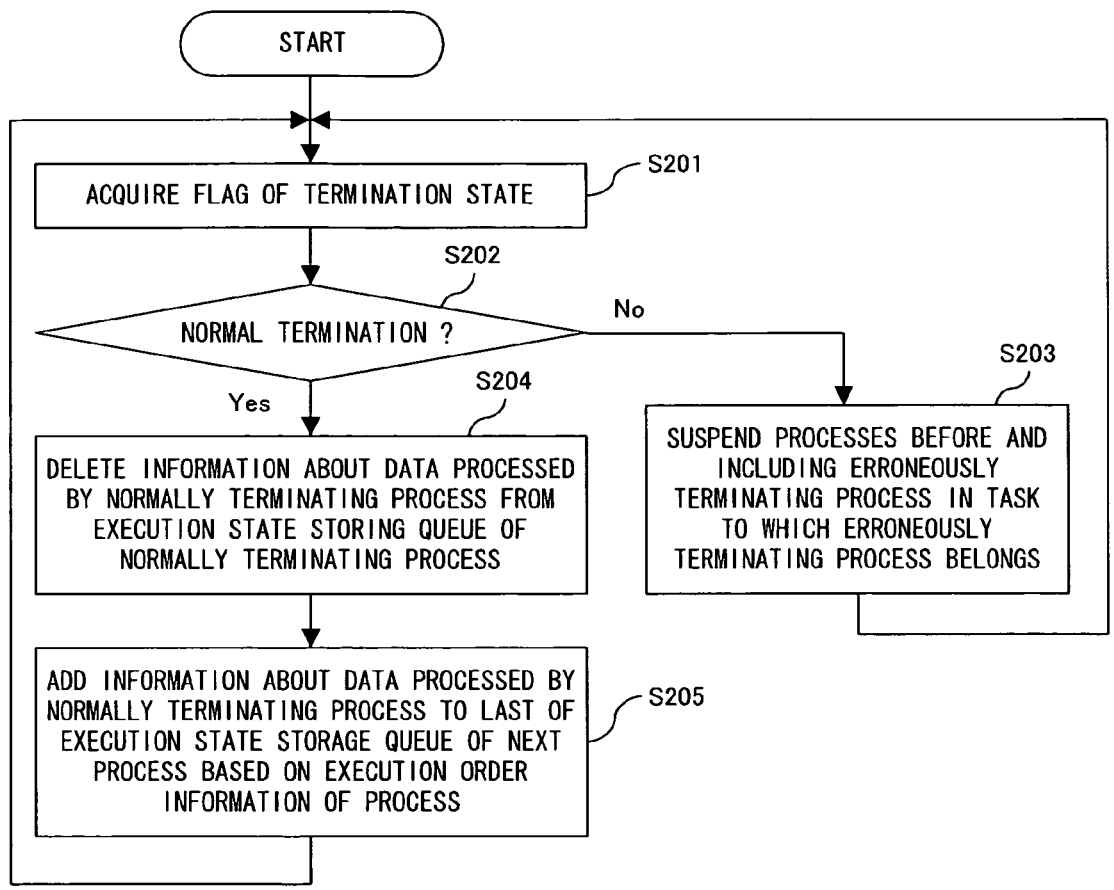
FIG. 7 is a flowchart showing processes executed by the process execution unit of FIG. 1 when process steps in a task terminates.

FIG. 7 is a flowchart showing processes executed by the process execution unit 18 of FIG. 1 when the process steps in a task terminate.

When each of the processes (collection process, distribution process, division process, conversion process, transmission process and the like) in the task is terminated, it sets flag information indicating the termination state of itself at a prescribed address in a memory. In step S201, the process execution unit 18 acquires the list of the termination state flags of all the processes included in at least one task being executed.

Then, in step S202, it is determined whether a value indicates a normal termination for each piece of flag information included in the acquired list of the flags of the termination states.

When it is determined in step S202 that there is a flag that is not a normal termination i.e., when there is a process which erroneously terminated), the process execution unit 18 suspends, in step S203, the processes (including the extraction of the slip data from the input queue) before the erroneously terminated process in the task to which the erroneously terminated process belongs. A user restarts this task from the data position where the erroneously terminated process was processing, after the error recovery.

Then, (when there is another executing task), the process returns to step S201.

When it is determined in step S202 that there is a flag indicating a normal termination, the process execution unit 18 deletes, in step S202, information about data processed by the normally terminated process from the process execution state recording unit (execution state storage queue) of the normally terminated process.

Then, in step S205, the process execution unit 18 adds information about the data processed by the normally terminated process to the end of the process execution state recording unit (execution state storage queue) of the next process based on the execution order of the processes in the task to which the normally terminated process belongs. Then, the process returns to step S201.

Therefore, it is possible to manage the execution state of the respective steps in one task. Accordingly, it is, for example, possible to sequentially execute the process steps in the task, and to accelerate the speed of the slip data processing.

Figure 8:
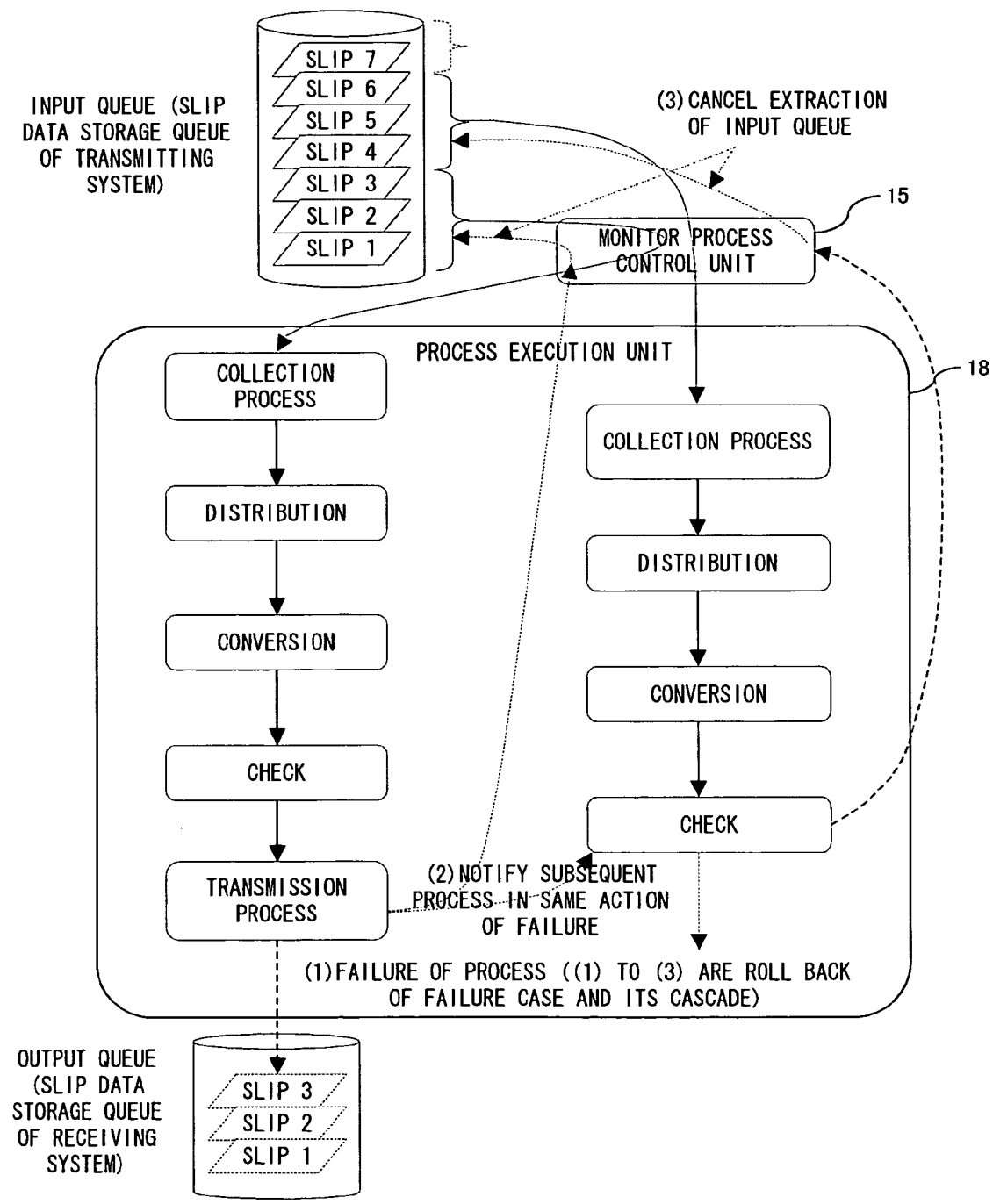
FIG. 8 shows processes executed by the process execution unit of FIG. 1 when an error occurs in a transmission process.

FIG. 8 shows a situation in which an error occurs in a transmission process. Specifically, when it is determined that the error has occurred in the transmission process based on the termination state flag in (1), the process subsequent to the task to which the erroneously terminated process (transmission process) belongs is suspended in (2). Also, in (3), the collection process in the task to which the erroneously terminated process (transmission process) belongs suspends acquiring the slip data from the input queue (slip data recording unit of the transmitting system, slip data storage queue of the transmitting system) of the task.

As shown in FIG. 8, the processes executed on the slip data also include a check process. In this check process, when, for example, bill data is processed as slip data, it can be checked if consistency is kept between the charged amount, the unit price and the quantity. The contents of the check executed in the check process depend on the kind of the slip data to be processed, usually.

Figure 9:
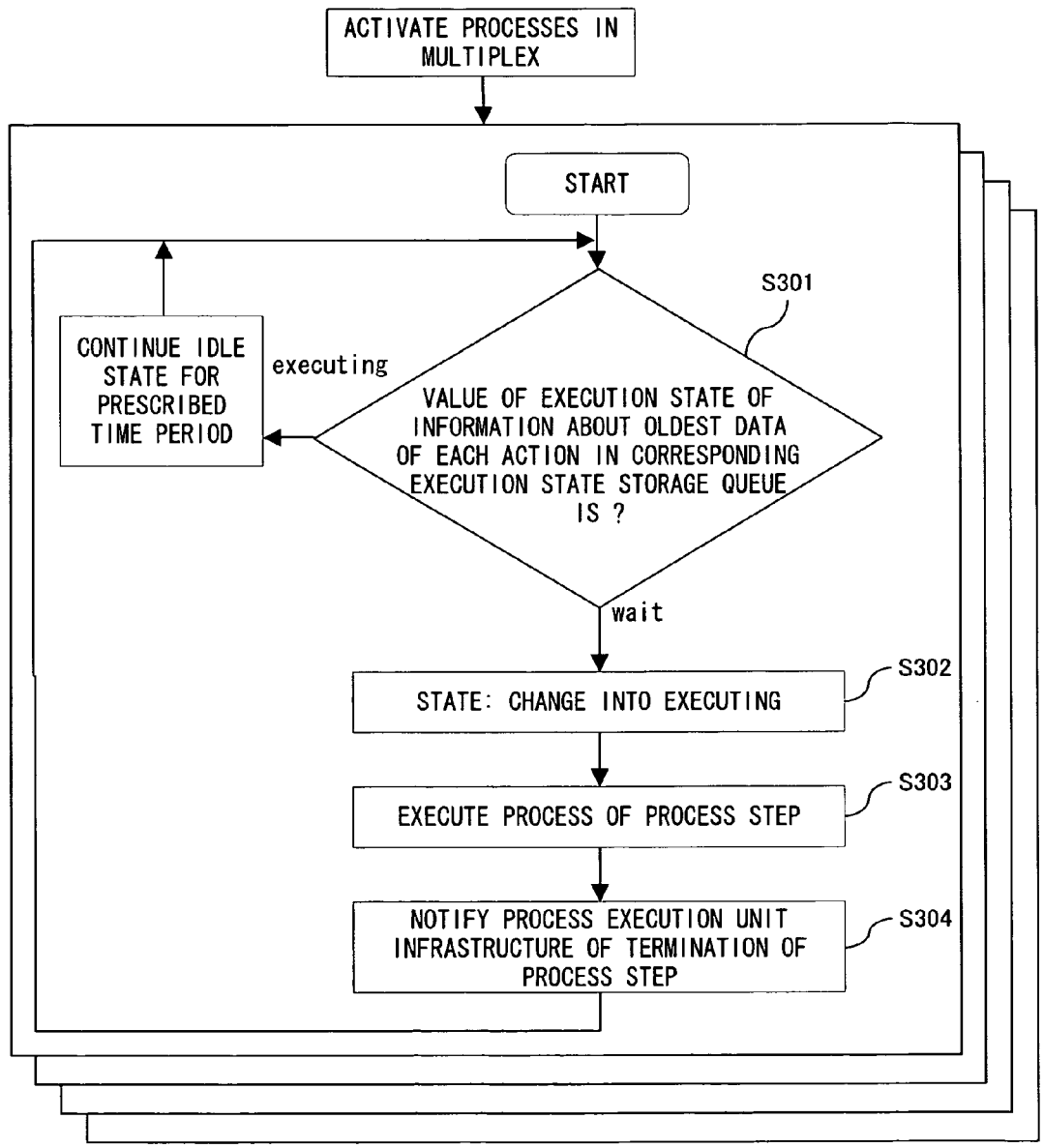
FIG. 9 is a flowchart of processes executed by process steps included in a task.

FIG. 9 is a flowchart of processes executed by the respective process steps included in the task.

In FIG. 9, first in step S301, information about data of each action in the corresponding execution state storage queue (process execution state recording unit) is retrieved. Then, the process branches in accordance with the value set as the execution state of the information with the oldest arrival time of FIG. 4 among the information of the data of the action for each of the actions.

Specifically, when the execution state of the information about the data with the oldest arrival time of the action is "Executing" in step S301, the process returns to step S301 after the idle state which lasts for a prescribed time period in step S305.

When the execution state of the information about the data with the oldest arrival time of the action is "Wait" in step S301, the execution state of the information about the data with the oldest arrival time of the action is changed to "Executing" in step S302. Then, in step S303, the data corresponding to the information about the data (in the execution state storage queue) whose execution state is changed to "Executing" is input, and the process to be executed (collection, distribution, conversion, transmission or the like) in the process itself is executed.

When the process to be executed terminates, the termination state flag is set at a prescribed memory position (address) in step S304, and the process returns to step S301 after the idle state which lasts for a prescribed time period in step S305.

Also, when there is not information about data in the corresponding execution state storage queue in step S301, the process proceeds to step S305.

As described above, for each action, only when the execution state of the information about the oldest data stored in the execution state storage queue is "Waiting", the data corresponding to the information about the oldest data is executed in the process step. Therefore, each process in the task corresponding to one action avoids processing two pieces of data simultaneously, and it is possible to deliver to the receiving system(s), the slip data acquired from one slip data recording unit of the transmitting system while securing the order of storage in the slip data recording unit.

FIG. 10A shows a configuration of data output as a result of the collection process by a task including the collection process, the distribution process, the conversion process, and the transmission process.

As shown in FIG. 10A, the result data of the collection process includes a destination, a header section, and a data section.

In FIG. 10A, five pieces of slip data (having IDs (slip unique numbers) A00001, B00011, B00012, B00013, and A00002 respectively) are acquired from the slip data storage queues of the transmitting system, and are collected into one piece of data in the collection process. Those pieces of slip data designated by the IDs of "B00011", "B00012", and "B00013" from among the five pieces of slip data all belong to the group with a group number G0000100. The data sections (for example business data) included in these five pieces of slip data, which can be in a fixed length or can be in a variable length, are separated by control characters (in the drawing, line feeds are used, however, the separations between the slips can be recognized by setting the data length in place of the line feeds). Also, at the time of the collection process, valid data is not usually set in the item called destination.

In FIG. 10A, the items in the data sections, "slip 1", "slip 2", "slip 3", "slip 4", and "slip 5" express data sections of the slip data with the IDs of A00001, B00011, B00012, B00013, and A00002, respectively.

FIG. 10B shows a data configuration of data output as a result of the distribution process by the task including the collection process, the distribution process, the conversion process, and the transmission process.

In FIG. 10B, as a result of the distribution process, five pieces of slip data included in the data of FIG. 10A are distributed to three pieces of slip data (i.e., three pieces of slip data having IDs of B00011, B00012, and B00013) to be transmitted to the destination "outnode1", and into two pieces of slip data (i.e., two pieces of slip data having IDs of A00001 and A00002) to be transmitted to the destination "outnode2".

In this distribution process, the destination (output queue) is set by referring to, for example, the company name or the like included in the data section. The destination setting process is usually executed at the time of the distribution or the conversion process. However, in the task including both the distribution process and the conversion process, the destination determined in the distribution process has a priority, for example.

FIG. 10C shows a data configuration of data output as a result of the conversion process by the task including the collection process, the distribution process, the conversion process, and the transmission process.

In FIG. 10C, the data sections of the slip data with the IDs of B00011, B00012, and B00013 are converted from "slip 2", "slip 3", and "slip 4" to "slip 2'", "slip 3'", and "slip 4'" as a result of the conversion process. Also, the data sections of the slip data having the IDs of A00001 and A00002 are converted from "slip 1" and "slip 5" to "slip 1'" and "slip 5'" as a result of the conversion process. Additionally, value, position, length, character code and the like of the data of the data section can be changed by the conversion process.

After the conversion process of FIG. 10C, the transmission process transmits the sections of the data other than the destination to the transmission destination(s) specified by the destination. In this example, the slip data is collected and transmitted (as one piece of data) to two destinations. It is also possible that the slip data is divided into pieces of single slip data and transmitted to the destination, depending on the rule (task).

Figure 11:
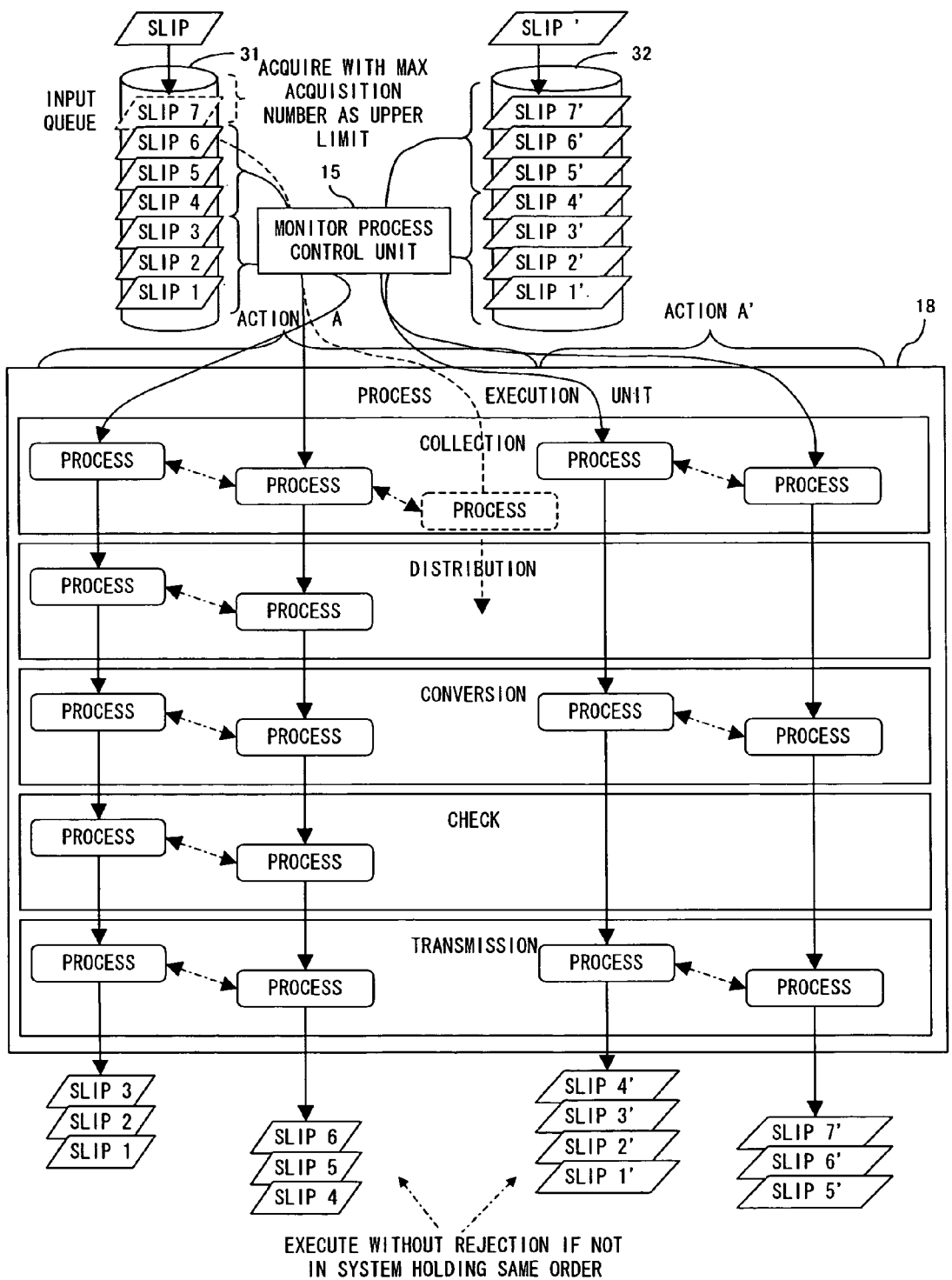
FIG. 11 explains the operations of the system of FIG. 1.

FIG. 11 explains the operations of the system of FIG. 1.

In FIG. 11, data extracted from input queues 31 and 32 provided in the transmitting system via the monitor process control unit 15 are processed in parallel (asynchronously) by the process execution unit 18. Since the action corresponding to the input queue 31 is different from the action corresponding to the input queue 32, the asynchronous process as above can be executed.

In the above, as shown in FIG. 11, a situation is explained in which the slip data extracted from a plurality of the input queues are executed asynchronously by the execution control unit 18. However, it is not surprising that in some situations, only one input queue exists as a target. Needless to say, in such situations, a corresponding task can be executed on slip data extracted from the one input queue by the execution control unit 18.

FIG. 12 shows an example of a recording medium.

The processes executed on slip data, according to the present invention, can be realized by an information processing device 61. It is possible to execute the program and data for the process of the present invention by loading the program and data into the memory of the information processing device 61 from a recording device 65 of the information processing device 61. It is also possible to execute them by loading them into the memory of the information processing device 61 from a portable recoding medium 63. It is also possible to execute them by loading them into the memory of the information processing device 61 from an external recording medium 62 via a network 66.

What is claimed is:

1. A non-transitory computer readable recording medium storing a slip data processing program for causing a computer to acquire slip data from an acquisition source and transmit the slip data to a transmission destination, wherein the program causes the computer to execute:

generating a task including a plurality of processes sequentially executed on the slip data acquired from the acquisition source, based on data created by making the acquisition source and the transmission destination of the slip data correspond to processes executed on the slip data, wherein the data is stored in a recording unit, setting discrimination information of the slip data in a process execution state recording unit corresponding to one of the plurality of processes included in the task, wherein the process execution state recording unit includes at least a collection process execution state recording unit, a distribution process execution state recording unit, a conversion process execution state recording unit and a transmission process execution state recording unit, the process execution state recording unit stores, the execution state of processes having a same name in at least one task executed by the process execution unit, in the collection process execution state recording unit, the distribution process execution state recording unit, the conversion process execution state recording unit and the transmission process execution state recording unit, respectively, regardless of the tasks the processes belong to, setting termination state information of the one of the plurality of processes in a termination state information recording unit, deleting the discrimination information of the slip data from the process execution state recording unit corresponding to the one of the plurality of processes, when the termination state information indicates a normal termination, and of setting the discrimination information of the slip data in a process execution state recording unit corresponding to a next process of the plurality of processes following the one of the plurality of processes, and processing processes having the same name in parallel regardless of the tasks the processes belong to.

2. The non-transitory computer readable recording medium of the slip data processing program according to claim 1, wherein only when an execution state of information about oldest data stored in the queue is a waiting state, data corresponding to the information about oldest data is executed by the process execution unit.

3. The non-transitory computer readable recording medium of the slip data processing program according to claim 1, wherein the program further causes the computer to execute:

acquiring at least one piece of slip data from the acquisition source of the slip data and of collecting the pieces of slip data into one piece of data, at a time of execution of the task, monitoring the acquisition source of the slip data and notifying information about slip data newly stored in the acquisition source, and the newly stored slip data which was notified is acquired from the acquisition source, and pieces of slip data is collected into one piece of data.

4. The non-transitory computer readable recording medium of the slip data processing program according to claim 1, wherein the program further causes the computer to execute:

collecting slip data for each transmission destination when there are a plurality of transmission destinations of slip data included in data to be processed.

5. The non-transitory computer readable recording medium of the slip data processing program according to claim 1, wherein the program further causes the computer to execute:

copying and generating as many pieces of data as the number of transmission destinations when data to be processed is broadcast to a plurality of transmission destinations.

6. A method of processing slip data in which a computer executes acquiring from an acquisition source and transmitting the slip data to a transmission destination, the method comprising:

generating a task including a plurality of processes sequentially executed on the slip data acquired from the acquisition source, based on data created by making the acquisition source and the transmission destination of the slip data correspond to processes executed on the slip data, wherein the data is stored in a recording unit, setting discrimination information of the slip data in a process execution state recording unit corresponding to one of the plurality of the processes included in the task, wherein the process execution state recording unit includes at least a collection process execution state recording unit, a distribution process execution state recording unit, a conversion process execution state recording unit and a transmission process execution state recording unit, the process execution state recording unit stores, the execution state of processes having a same name in at least one task executed by the process execution unit, in the collection process execution state recording unit, the distribution process execution state recording unit, the conversion process execution state recording unit and the transmission process execution state recording unit, respectively, regardless of the tasks the processes belong to, setting a termination state information of the one of the processes in a termination state information recording unit, deleting the discrimination information of the slip data from the process execution state recording unit corresponding to the one of the plurality of processes, when the termination state information indicates a normal termination, and of setting the discrimination information of the slip data in a process execution state recording unit corresponding to a next process of the plurality of processes following the one of the plurality of processes, and processing processes having the same name in parallel regardless of the tasks the processes belong to.

7. The method of processing slip data according to claim 6, wherein:

only when an execution state of information about oldest data stored in the queue is a waiting state, data corresponding to the information about the oldest data is executed by the process execution unit.

8. The method of processing slip data according to claim 6, further comprising:

acquiring at least one piece of slip data from the acquisition source of the slip data and of collecting the pieces of slip data into one piece of data, at a time of execution of the task, and monitoring the acquisition source of the slip data and notifying information about slip data newly stored in the acquisition source, wherein:

the newly stored slip data which was notified is acquired from the acquisition source, and pieces of slip data is collected into one piece of data.

9. A slip data processing device executing a process for acquiring slip data from an acquisition source and transmitting the slip data to a transmission destination, the device comprising:

a process execution unit to execute:

generating a task including a plurality of processes sequentially executed on the slip data acquired from the acquisition source, based on data created by making the acquisition source and the transmission destination of the slip data correspond to processes executed on the slip data, wherein the data is stored in a recording unit, and setting discrimination information of the slip data in a process execution state recording unit corresponding to one of the plurality of processes included in the task, wherein the process execution state recording unit includes at least a collection process execution state recording unit, a distribution process execution state recording unit, a conversion process execution state recording unit and a transmission process execution state recording unit, the process execution state recording unit stores, the execution state of processes having a same name in at least one task executed by the process execution unit, in the collection process execution state recording unit, the distribution process execution state recording unit, the conversion process execution state recording unit and the transmission process execution state recording unit, respectively, regardless of the tasks the processes belong to, setting termination state information of the one of the plurality of processes in a termination state information recording unit, deleting the discrimination information of the slip data from the process execution state recording unit corresponding to the one of the plurality of processes, when the termination state information indicates a normal termination, and setting the discrimination information of the slip data in a process execution state recording unit corresponding to a next process of the plurality of processes following the one of the plurality of processes, and processing processes having the same name are processed in parallel regardless of the tasks the processes belong to.

10. The slip data processing device according to claim 9, wherein:

only when an execution state of information about oldest data stored in the queue is a waiting state, the process execution unit executes data corresponding to the information about the oldest data.

11. The slip data processing device according to claim 9, further comprising:

an acquiring and collecting unit to acquire at least one piece of slip data from the acquisition source of the slip data and to collect the pieces of slip data into one piece of data, at a time of execution of the task, a monitoring and notifying unit to monitor the acquisition source of the slip data and to notify the acquiring and collecting unit of information about slip data newly stored in the acquisition source, wherein the process execution unit acquires from the acquisition source the newly stored slip data of which the acquiring and collecting unit was notified and collects the newly stored slip data.

12. The non-transitory computer readable recording medium of the slip data processing program according to claim 1, wherein:

each of the collection process execution state recording unit, the distribution process execution state recording unit, the conversion process execution state recording unit and the transmission process execution state recording unit stores a plurality of records, each of the plurality of records at least includes fields of an action name, an arrival time, an execution state, a pointer to data, and a pointer to information about the data, the pointer to data field contains a top address of a process result data in an immediately preceding, when the execution state field contains an executing state, the process in the current process step on the data whose top address is set in the pointer to data field is executed, when the execution state field contains a wait state, the process in the current process step on the data, whose top address is set in the pointer to data field is not executed yet and is waited for execution, the arrival time field indicates a time at which a record is written in the process execution state recording unit of the corresponding process, and the pointer to information about data field includes a pointer provided between the respective records in an order of the arrival time, the process execution state recording units corresponding to the respective processes constitute queues using the pointer.

13. The method of processing slip data according to claim 6, wherein:

each of the collection process execution state recording unit, the distribution process execution state recording unit, the conversion process execution state recording unit and the transmission process execution state recording unit stores a plurality of records, each of the plurality of records at least includes fields of an action name, an arrival time, an execution state, a pointer to data, and a pointer to information about the data, the pointer to data field contains a top address of a process result data in an immediately preceding, when the execution state field contains an executing state, the process in the current process step on the data whose top address is set in the pointer to data field is executed, when the execution state field contains a wait state, the process in the current process step on the data, whose top address is set in the pointer to data field is not executed yet and is waited for execution, the arrival time field indicates a time at which a record is written in the process execution state recording unit of the corresponding process, and the pointer to information about data field includes a pointer provided between the respective records in an order of the arrival time, the process execution state recording units corresponding to the respective processes constitute queues using the pointer.

14. The slip data processing device according to claim 9, wherein:

each of the collection process execution state recording unit, the distribution process execution state recording unit, the conversion process execution state recording unit and the transmission process execution state recording unit stores a plurality of records, each of the plurality of records at least includes fields of an action name, an arrival time, an execution state, a pointer to data, and a pointer to information about the data, the pointer to data field contains a top address of a process result data in an immediately preceding, when the execution state field contains an executing state, the process in the current process step on the data whose top address is set in the pointer to data field is executed, when the execution state field contains a wait state, the process in the current process step on the data, whose top address is set in the pointer to data field is not executed yet and is waited for execution, the arrival time field indicates a time at which a record is written in the process execution state recording unit of the corresponding process, and the pointer to information about data field includes a pointer provided between the respective records in an order of the arrival time, the process execution state recording units corresponding to the respective processes constitute queues using the pointer.

* * * * *